United States Patent [19]

Kurtz et al.

[11] 3,860,595

[45] Jan. 14, 1975

[54] PRODUCTION OF CHLORIDE FROM ETHYLENE DICHLORIDE

[75] Inventors: Bruce E. Kurtz, Marcellus; Bhaskar Bandyopadhyay, Camillus, both of N.Y.

[73] Assignee: Allied Chemical Corporation, New York, N.Y.

[22] Filed: Apr. 21, 1972

[21] Appl. No.: 246,343

[52] U.S. Cl. .............................. 260/656 R
[51] Int. Cl. .............................. C07c 21/02
[58] Field of Search ................ 260/656 R

[56] References Cited
UNITED STATES PATENTS
2,378,859  6/1945  Mugdan et al. ............... 260/656
3,233,006  2/1966  Burk, Jr. et al. ............... 260/656

*Primary Examiner*—Bernard Helfin
*Assistant Examiner*—Alan Siegel
*Attorney, Agent, or Firm*—G. P. Rooney

[57] ABSTRACT

Process for the conversion of saturated chlorinated aliphatic hydrocarbons containing two or three carbon atoms, to produce unsaturated chlorinated hydrocarbons, featuring the incorporation of iodine or an iodoalkane having 1 to 3 carbon atoms, to promote the operation.

6 Claims, No Drawings

PRODUCTION OF CHLORIDE FROM ETHYLENE DICHLORIDE

BACKGROUND OF THE INVENTION

I. Field of the Invention

This invention relates to a process for the production of unsaturated chlorinated hydrocarbons by the conversion thereto of saturated chlorinated aliphatic hydrocarbons. More particularly, it relates to an improved vapor phase pyrolytic cracking process for the converting ethylene chloride to vinyl chloride.

II. Description of the Prior Art

It is well known that such unsaturated aliphatic chlorinated hydrocarbons as vinyl chloride, vinylidene chloride, trichloroethylene, and allyl chloride can be produced by the vapor phase pyrolytic cracking of ethylene dichloride; 1,1,2-trichloroethane; 1,1,2,2-tetrachloroethane and 1,2-dichloropropane, respectively. Of these unsaturated products, vinyl chloride is of special interest because of the great demand for the vinyl chloride polymer.

Vinyl chloride is produced by cracking ethylene dichloride according to the following reaction:

$$CH_2ClCH_2Cl \rightarrow CH_2=CHCl + HCl$$

This reaction, in typical practice, is carried out in the gas phase at temperatures of 480°–590°C. and at pressures of 1 – 40 atmospheres. The residence time at the cracking temperature is typically in the range of 5 – 30 seconds. Conversion of ethylene dichloride to vinyl chloride is typically in the range of 40 – 90 percent and the yield of vinyl chloride is greater than 95 percent. In a typical reaction system the ethylene dichloride is fed as a liquid, heated to its boiling point at the chosen operating pressure and vaporized. The vapor is heated further and cracked to vinyl chloride and HCl. Because of the highly endothermic nature of the reaction, most of the heat input is to the cracking step.

A typical reactor comprises a furnace containing tubes in series through which the ethylene dichloride flows. The tubes are heated with gas or oil-fired burners mounted in the furnace, by direct radiation, indirect and convection. Both vaporization and cracking may be carried out in a single furnace, or the ethylene dichloride may be vaporized separately and then fed to a furnace for cracking.

The diameter and total length of the tubes in the cracking furnace depends on consideration of the amount of heat to be transferred, the maximum allowable tube wall temperature and the desired residence time at the cracking temperature. Smaller diameter tubes, with their high surface to volume ratio, lend themselves to short residence times and low tube wall temperatures; large diameter tubes, with their low surface to volume ratio, require longer residence times in order to maintain low tube wall temperatures. In practice, tube diameters in the range of 1 – 8 inches are employed. In operation a carbonaceous deposit forms on the inside wall of the tubes, eventually building up to the point where the flow of reactant and products through the tubes is restricted, so that processing must be interrupted and the deposit removed.

It is obviously advantageous to maximize the production rate of vinyl chloride from any given cracking furnace. The production rate can be calculated from the expression $$P = 62.5/98.9 \, YFC$$

where 62.5/98.9 = M.W. of Vinyl Chloride/M.W. of Ethylene Dichloride

Y = Fractional yield to vinyl chloride

F = Feed rate of ethylene dichloride

C = Fractional conversion of ethylene dichloride

The fractional yield to vinyl chloride is essentially constant and near unity, hence the production rate of vinyl chloride is directly proportional to both the feed rate of ethylene dichloride and the conversion of ethylene dichloride. Accordingly, the production rate of vinyl chloride can be increased by increasing either the feed rate or the degree of conversion. However, the unconverted ethylene dichloride must be separated from the vinyl chloride and hydrogen chloride produced by the cracking reaction, purified by removal of traces of by-products produced in cracking and recycled to the feed end of the cracking furnace. Increasing the conversion decreases the quantity of unreacted ethylene dichloride to be purified and recycled and thus reduces the processing costs. Therefore, it is most advantageous to increase the production rate of vinyl chloride by increasing conversion.

An increase in the production rate of vinyl chloride for a given cracking furnace must be accompanied by an increase in the heat input which will, under ordinary circumstances, result in an increase in the tube wall temperature. This has the disadvantage of increasing the rate of corrosive attack on the tube wall by the hydrogen chloride produced by the cracking reaction and of reducing the ability of the tube wall to withstand stress. Also, an increase in tube wall temperature would be expected to increase the rate of formation of the carbonaceous deposit, thus increasing the frequency of process interruptions. An increase in conversion to vinyl chloride without the accompanying disadvantageous increase in tube wall temperature can be accomplished by increasing the rate of the ethylene dichloride cracking.

The overall reaction of ethylene dichloride to vinyl chloride and hydrogen chloride is generally though to occur by a free radical mechanism:

$$CH_2ClCH_2Cl + Cl\cdot \rightarrow CH_2ClCHCl\cdot + HCl$$

$$CH_2ClCHCl\cdot \rightarrow CH_2=CHCl + Cl\cdot$$

The chain initiation normally occurs by dissociation of ethylene dichloride:

$$CH_2ClCH_2Cl \rightarrow CH_2ClCH_2\cdot + Cl\cdot$$

Chain termination occurs by recombination of organic free radicals with themselves or with chlorine atoms, for example:

$$CH_2ClCH_2\cdot + CH_2ClCH_2\cdot \rightarrow CH_2ClCH_2CH_2CH_2Cl$$

$$\xrightarrow{-2\,HCl} CH_2=CHCH=CH_2$$

$$CH_2ClCH_2\cdot + Cl\cdot \rightarrow CH_2ClCH_2Cl$$

The overall rate at which ethylene dichloride is converted to vinyl chloride and hydrogen chloride depends on the concentration of chlorine atoms and thus on the competition between chain initiation and chain termination. Compounds which readily break down to form atoms or free radicals capable of undergoing the necessary chain transfer steps:

$$AB \rightarrow A\cdot + B\cdot$$

$$CH_2ClCH_2Cl + A\cdot \rightarrow CH_2ClCHCl\cdot + ACl$$

might therefore be expected to accelerate the overall rate of reaction. In fact, the use of elemental chlorine as an accelerator in the cracking of ethylene dichloride has long been practiced. The usual range of concentration of chlorine in the ethylene dichloide is 0.5 to 3.0 weight percent. The accelerating action of the chlorine comes about by dissociation of the chlorine molecules into chlorine atoms, thus increasing the concentration of chlorine atoms and increasing the rate of the chain propagating reactions which convert ethylene dichloride to vinyl chloride. Unfortunately, the added chlorine also reacts to a great extent to form trichloroethane:

$$CH_2ClCH_2Cl + Cl\cdot \rightarrow CH_2ClCHCl\cdot + HCl$$

$$Cl_2 + CH_2ClCHCl\cdot \rightarrow CH_2ClCHCl_2 + Cl\cdot$$

especially at temperatures below that at which cracking takes place where the molecular chlorine is only slightly dissociated. This trichloroethane subsequently cracks to form cis- and trans-dichloroethylene and vinylidene chloride, by-products which must be removed in the purification step and which reduce the yield of vinyl chloride from ethylene dichloride. In order to prevent the chlorine from being entirely consumed in this way, and thus being unavailable to accelerate the ethylene dichloride cracking reaction, the chlorine is often introduced to the reactor only after the ethylene dichloride is vaporized and heated to the temperature where cracking begins, about 900°F. In this method, however, the metering of the chlorine is difficult and there are serious materials of construction problems in handling chlorine at that high temperature.

Although the use of chlorine as a cracking accelerator had led to the presence and formation of foreign substances which have been costly to remove, and although it has led to corrosive conditions with correspondingly high maintenance costs, these costs and deleterious effects have been accepted in commercial practice, in order to obtain the benefits of its action as a cracking accelerator. Chlorine has remained the most widely used accelerator.

Another halogen, iodine, has not been used in the past, for reasons quite understandable. It has been reported in the literature as having "little or no effect" (Chem. Abs. Vol. 54, pg. 9721C) and it is about 50 to 100 times as costly as chlorine.

SUMMARY OF THE INVENTION

We have now found, surprisingly, that elemental iodine, as well as iodine in organic combination is especially effective as a cracking accelerator in the production of unsaturated chlorinated hydrocarbons from saturated chlorinated aliphatic hydrocarbons, having at least two chlorine atoms on adjacent carbon atoms, as for example, in the pyrolytic cracking of ethylene dichloride to produce vinyl chloride. Not only is it effective in increasing the product yield by as much as 10 to 15 percent, but it reduces the amount of carbon buildup, thus reducing equipment down-time and the amount of by-product formation, thus reducing purification costs. Furthermore, we have found that although iodine is an effective cracking accelerator in amounts comparable to those employed in prior art methods employing chlorine, it is also effective when present in lesser amounts. Indeed, we have found that iodine is exceptionally effective as a cracking accelerator in amounts so minute, as contrasted with the quantities of chlorine normally employed, that the situation is frequently reversed, with the cost of the consumed iodine becoming competitive with, or falling below, that of the chlorine. Best results are obtained by the use of iodine in the substantial absence of elemental chlorine.

DESCRIPTION OF THE PREFERRED EMBODIMENT

The method of the present invention is applicable to the pyrolytic cracking of chlorinated saturated aliphatic hydrocarbons having at least two chlorine atoms on adjacent carbon atoms, particularly those hydrocarbons having two or three carbon atoms, to produce unsaturated chlorinated hydrocarbons. More particularly, the present invention relates to a vapor phase pyrolytic cracking procedure for the conversion of ethylene chloride to vinyl chloride in good yield. By using the generic term "ethylene chloride," we mean to include ethylene chlorides or "ethane chlorides," having at least two chlorine atoms on adjacent carbon atoms such as ethylene dichloride and ethylene trichloride.

We have found a new class of substances which function as accelerators for the cracking of ethylene dichloride to vinyl chloride. These substances function at much lower concentrations than specified previously for other accelerators, they can be added to the ethylene dichloride before being fed to the cracking furnace and they do not form deleterious amounts of by-products. Among these substances is iodine which may be added as elemental iodine or produced in situ. The remaining substances are partially or fully iodinated aliphatic hydrocarbons containing one to three carbon atoms. The most effective accelerators are those containing the fewest carbon atoms and the most iodine atoms; for example, iodoform is a more effective accelerator than is 3-iodopropene. These substances are effective in the range of 1–1,000 ppm, the desired concentration depending on the desired effect. These substances can be used to increase the conversion obtained at a given temperature or to decrease the temperature required to obtain a given conversion. An unexpected and very important additional benefit in the use of these substances is a decrease in the rate of formation of the carbonaceous deposit in the tubes in which the cracking reaction takes place.

For economical operation, the iodine is preferably added in an amount of between 5 and 200 parts per million to the ethylene chloride for vaporization during the pyrolysis, or it may be introduced as a vapor into the zone of pyrolysis. When the vinyl chloride is separated from the reaction product, it is found to be present in amounts representing about a 10 to 15 percent yield improvement over that normally obtained from such a pyrolytic process when carried out without benefit of a cracking accelerator.

The iodine employed in the present process may be elemental, or it may be in chemical combination. In a preferred embodiment, it is in the form of an iodoalkane having from 1 to 3 carbon atoms, or more desirably, 1 to 2 carbon atoms. As noted above, the concentration of the elemental iodine, or of the iodine content of an iodoalkane or other suitable iodine compound, is preferably between 5 and 200 parts per million based on the weight of the ethylene chloride.

The lower limit represents the approximate concentration at which the addition of iodine begins to exert a worthwhile effect as a cracking accelerator, and the upper FIGURE represents that at which addition of further iodine begins to become wasteful due to asymptotic limitation of the improvement in yield.

The reaction conditions may be any customarily used in the art, typically with residence times of from about 5 to 30 seconds in the cracking zone, with temperatures in the range of about 400° – 600°C., preferably between about 480° to 590°C. Longer residence times may be used, but will ordinarily lead to higher costs and undesirable side products while contributing no significant additional benefit. The pyrolysis may be carried out at pressures within the range of about 1 to 50 atmospheres, with pressures of 5–20 atomospheres being preferred.

The iodine or iodine-containing compound may be commingled with the ethylene chloride at any point in its flow, or it may be dissolved in the ethylene chloride before the latter is vaporized and injected into the reaction zone. Alternately, it may be injected as a vapor or in solution, into a stream of ethylene chloride vapor or liquid being forwarded to the reaction zone, or it may be injected in any of these forms directly into the reaction zone.

With the foregoing general discussion in mind, there are given herewith, detailed examples demonstrating the use of these substances as accelerators for the cracking of ethylene dichloride to vinyl chloride for minimizing the formation of undesirable by-products, reducing the rate of formation of carbonaceous deposits on the walls of the reactor tube and increasing the degree of conversion to vinyl chloride. All parts are given by weight.

The apparatus of the first four examples consisted of a Vycor reactor tube 4 mm inside diameter and 250 mm long, externally heated, to which was fed liquid ethylene dichloride. The ethylene dichloride was vaporized and heated to cracking temperature in the first few millimeters of the feed end of the reactor. The reactor was under atmospheric pressure. The reaction products leaving the exit end of the reactor were passed through a sampling valve from which they were periodically introduced into a gas chromatograph for analysis. The conversion of ethylene dichloride to vinyl chloride was determined by the relative amounts found by the analysis.

The reactor was equipped with two electrodes, one mounted at the feed end, the other at the exit end, protruding into the reactor to within about 50 mm of each other in the approximate center of the reactor tube, at which point they were in firm contact with the reactor tube wall. These electrodes were used to measure the electrical conductance of the carbonaceous deposit formed on the reactor wall. This conductance increases substantially in direct proportion to the thickness of the carbonaceous deposit, which is very thin compared to the diameter of the reactor tube, hence the rate of increase of the conductance between the electrodes is an indirect measure of the rate of formation of the carbonaceous deposit.

When measuring the effect of an accelerating substance on conversion of ethylene dichloride, the feed to the reactor was alternated between pure ethylene dichloride and ethylene dichloride containing a predetermined amount of the substance being evaluated as a cracking accelerator. The increase in the conversion resulting from the accelerating substance was taken as a measure of its effectiveness. When measuring coking rate either pure ethylene dichloride or ethylene dichloride containing a predetermined amount of the substance being evaluated as a cracking accelerator was fed to the reactor and the conductance between the two reactor electrodes was determined as a function of time. After each run the carbonaceous deposit was removed by passing air through the heated reactor for a period of several hours.

The procedure of alternating the feeds is important because the conversion obtained is slightly higher in a clean reactor tube than in a tube which is covered with a continuous carbonaceous deposit. Over the course of the run the conversion approaches an asymptotic value. The conversion obtained with pure ethylene dichloride approaches one asymptotic value, the conversion obtained with ethylene dichloride containing the accelerator approaches a higher asymptotic value. An additional advantage of employing alternating feeds in the same run is that it is possible to maintain a more constant reactor temperature and ethylene dichloride feed rate over the course of a single run than in two independent runs. Thus, the effects of uncontrolled temperature and feed rate variations between runs, which profoundly affect conversion, are not allowed to obscure the effects of the reaction accelerator.

The first two examples illustrate the effectiveness of iodine as a cracking accelerator:

EXAMPLE 1

The laboratory reactor described above was fed 2.42 gms/hr. of pure ethylene dichloride for 1.16 hours, followed by 2.42 gms/hr. of ethylene dichloride containing 10 ppm by weight of iodine for 1.16 hours, followed by 2.42 gms/hr. of pure ethylene dichloride for 1.16 hours, followed by 2.42 gms/hr. of ethylene dichloride containing 10 ppm by weight iodine for 1.16 hours, followed by 2.42 gms/hr. of pure ethylene dichloride for 1.16 hours. The reactor temperature was 498°C. The asymptotic conversion of ethylene dichloride to vinyl chloride without the iodine was 46 percent, with the iodine the asymptotic conversion increased to 69 percent.

EXAMPLE 2

In the apparatus of Example 1 under the same conditions except that the reactor temperature was 493°C. and the concentration of iodine was 30 ppm by weight, the asymptotic conversion was increased from 45 percent to 74 percent.

EXAMPLE 3

A further series of experiments was carried out in large scale equipment comprising four parallel natural gas fired cracking furnaces, basically as described earlier, each fed at a rate of about 24,000 No./hr of ethylene dichloride. The temperature and pressure at the exit end of the last tube in each cracking furnace was in the range of 530° – 540°C. and 260 – 270 psig, respectively. The average conversion of all four furnaces was measured by the relative amounts of unreacted ethylene dichloride and vinyl chloride recovered from the streams exiting the cracking furnaces. In these large scale cracking furnaces, the average conversion of ethylene dichloride to vinyl chloride was increased from 57 percent with pure ethylene dichloride feed to 63 percent with 20 ppm by weight iodine in the ethylene dichloride feed and to 66 percent with 30 ppm by weight iodine in the ethylene dichloride feed, all other operating conditions being essentially unchanged. The effect of the iodine addition is nearly instantaneous. As soon as the iodine reaches the cracking furnaces, there is an immediate step increase in gas flow to the burners, reflecting the greater demand for heat resulting from the increased conversion.

The rate of formation of the carbonaceous deposit on the walls of the laboratory reactor tube was measured from the rate of increase in electrical conductance between the two reactor electrodes. A plot of the electrical conductance versus time fits the line represented by $$1/C = a + b/t$$

Where $C$ = Electrical conductance of the carbonaceous deposit between the two electrodes (ohms$^{-1}$).

$a$ = Intercept (ohms)

$b$ = Slope (ohm-minutes)

$t$ = Time (minutes)

The change in conductance with time is directly proportional to the rate of formation of the carbonaceous deposit, hence the larger the "$b$" value, the lower the rate of formation of the carbonaceous deposit.

The following example illustrates the effectiveness of iodine in reducing the rate of formation of the carbonaceous deposit:

EXAMPLE 4

In the apparatus of Example 1 at a reactor temperature of 497°C., pure ethylene dichloride was fed at 2.42 gms/hr. The conversion was 50 percent and the "$b$" value was $4.06 \times 10^6$ ohm-minutes. In the same apparatus at a reactor temperature of 482°C., ethylene dichloride containing 10 ppm by weight iodine was fed at 2.42 gms/hr. The conversion was 70 percent and the "$b$" value was $124.8 \times 10^6$ ohm-minutes, a substantial decrease in the rate of formation of the carbonaceous deposit.

EXAMPLE 5

The laboratory reactor of Example 1 was fed 2.42 gms/hr of pure ethylene dichloride for 1.16 hours, followed by 2.42 gms/hr of ethylene dichloride containing 10 ppm by weight of iodoform for 1.16 hours, followed by 2.42 gms/hr of pure ethylene dichloride for 1.16 hours, followed by 2.42 gms/hr of ethylene dichloride containing 10 ppm by weight of iodoform for 1.16 hours, followed by 2.42 gms/hr of pure ethylene dichloride for 1.16 hours. The reactor temperature was 487°C. The asymptotic conversion of ethylene dichloride to vinyl chloride without iodoform was 58 percent, with the iodoform the asymptotic conversion increased to 79 percent.

Since certain changes may be made in carrying out the above process without departing from the scope of the invention, it is intended that all matter contained in the above description shall be interpreted as illustrative and not in a limiting sense.

We claim:

1. A process for the manufacture of vinyl chloride monomer by cracking ethylene dichloride which comprises carrying out the reaction in the vapor phase at elevated temperatures in the range of 400° to 600°C in the presence of an additive selected from the group consisting of iodine or an iodinated aliphatic hydrocarbon containing 1 to 3 carbon atoms present in amounts in the range of 1 to 1,000 parts per million, basis iodine content.

2. The process of claim 1 wherein the amount of additive is from 5 to 200 parts per million.

3. The process of claim 1 wherein the reaction is carried out in a substantial absence of elemental chlorine.

4. The process according to claim 1 wherein the iodine or iodinated aliphatic hydrocarbon is added to the liquid saturated chlorinated aliphatic hydrocarbon before being fed to the reactor.

5. The process according to claim 1 wherein the cracking reaction is carried out in the presence of iodine.

6. The process according to claim 1 wherein the cracking reaction is carried out in the presence of an iodinated aliphatic hydrocarbon containing one to three carbon atoms, inclusive.

* * * * *